No. 745,721. PATENTED DEC. 1, 1903.
W. FETZER.
BEVEL GEAR CONNECTION FOR SEEDERS.
APPLICATION FILED APR. 10, 1903.
NO MODEL.
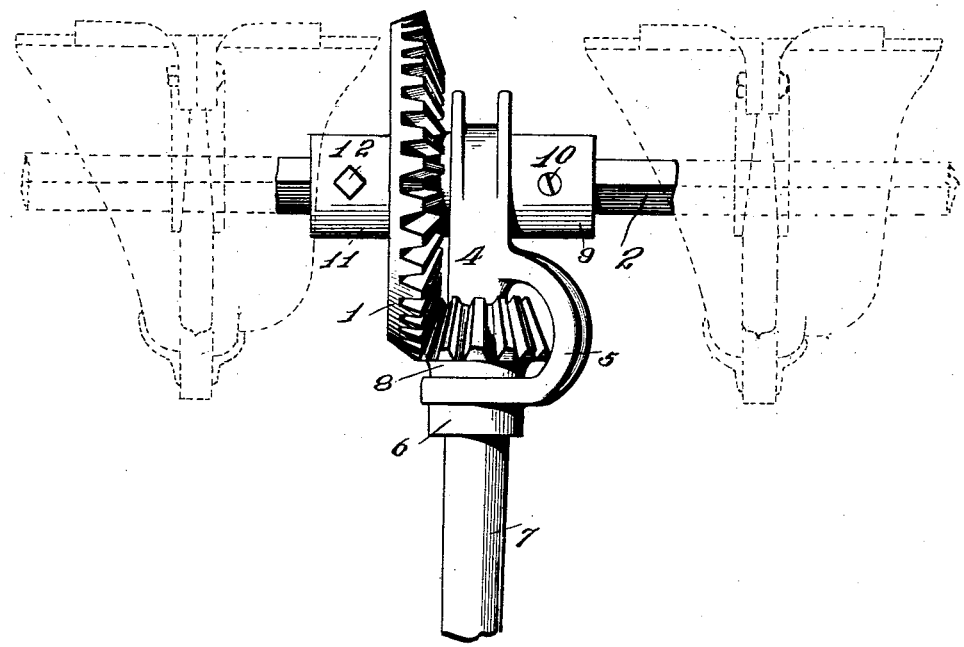
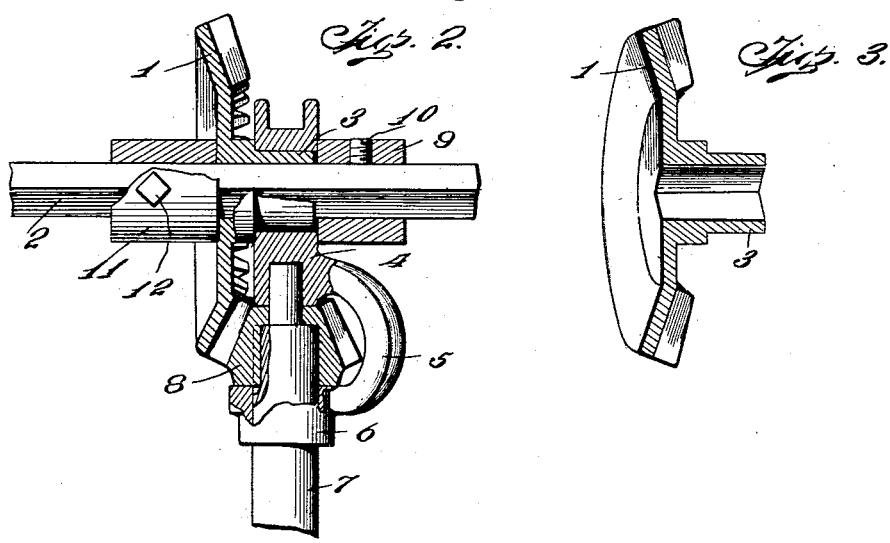
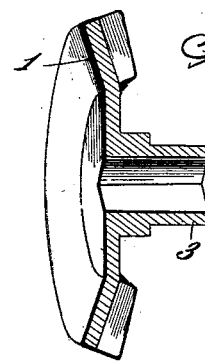

No. 745,721. Patented December 1, 1903.

UNITED STATES PATENT OFFICE.

WILLIAM FETZER, OF MIDDLETOWN, OHIO.

BEVEL-GEAR CONNECTION FOR SEEDERS.

SPECIFICATION forming part of Letters Patent No. 745,721, dated December 1, 1903.

Application filed April 10, 1903. Serial No. 152,024. (No model.)

*To all whom it may concern:*

Be it known that I, WILLIAM FETZER, a citizen of the United States, residing at Middletown, in the county of Butler and State of Ohio, have invented certain new and useful Improvements in Bevel-Gear Connections for Seeders; and I do hereby declare the following to be a full, clear, and exact description of the invention, such as will enable others skilled in the art to which it appertains to make and use the same.

My invention has reference to improvements in bevel-gear connections, and particularly to means for retaining a rotating shaft in a given relation to a second rotating shaft extending at right angles to the first and receiving power therefrom.

The object in view is the production of mechanism designed particularly for use in connection with seeders for supporting a drive-shaft at right angles to a seed-cup-dropper-actuating shaft while permitting communication of power between said shafts.

With this and other objects in view the invention consists in combination, with a power-shaft and an operating-shaft at right angles thereto, of a gear carried by said operating-shaft and formed with a stem projecting therefrom, a bracket finding a bearing on said stem, and a pinion carried by said bracket meshing with said gear-wheel and receiving power from said power-shaft.

It further consists in certain other novel constructions, combination, and arrangements of parts, as will be hereinafter fully described and claimed.

In the accompanying drawings, Figure 1 represents a view in side elevation of a bevel-gear connection embodying the features of the present invention, the common type of seed-cups being illustrated in connection therewith in their given relation. Fig. 2 represents a vertical central section through the parts. Fig. 3 represents a detail section through the bevel-gear detached.

In grain-seeders it is common to provide suitable grain-cups and a common shaft therefor for operating the discharge mechanism thereof, said shaft being usually driven from the axle of the seeder, motion being imparted from said axle to said shaft through an interposed power-shaft and suitable gearing. By the present invention I contemplate accomplishing this result with a minimum of parts, which parts, as disclosed in the accompanying drawings, consist of a bevel-gear 1, mounted upon an operating-shaft 2, said shaft being preferably polysided and said gear being provided with a stem or sleeve 3, extending from the front face thereof, inclosing said shaft and forming a bearing for a bracket 4. The bracket 4 finds a bearing on the cylindrical outer surface of stem 3 and carries a laterally bent or curved strap 5, preferably formed integral therewith and carrying at its free end a sleeve 6. The bracket 4 is bored vertically in alinement with the bore or sleeve 6 for receiving the end of power-shaft 7, which shaft extends through sleeve 6 and carries a pinion 8 between said sleeve and the body portion of the bracket 4 in position for normally meshing with the gear 1. In front of the bracket 4 is arranged a sleeve 9, surrounding shaft 2 and locked thereto by any suitable set-screw 10, whereby the parts will be prevented from having lateral movement in one direction longitudinally of shaft 2, and a sleeve 11, surrounding said shaft and locked thereto by a screw 12, prevents lateral play in the opposite direction.

Although I have illustrated the sleeve 11 as formed separately and independent of the gear 1, yet it will be readily obvious that the same may be made integral therewith without deviation from the present invention.

From the foregoing it will be observed that the shaft 7 extends at right angles to the plane of shaft 2 and is supported in position for imparting movement to said latter shaft by a bracket revolubly mounted about a polysided shaft, no auxiliary braces or outside parts being necessary for retaining the shafts in their given relations.

Having thus fully described my invention, what I claim as new, and desire to secure by Letters Patent, is—

1. A mechanism of the class described, comprising a driven shaft and a driving-shaft, a bevel-gear secured to the driven shaft, a bevel-pinion carried by the driving-shaft and meshing with said gear, a locking-bracket bearing against the hubs of both of said gears and means separate from the bevel-gear for preventing its longitudinal movement upon the driven shaft.

2. An actuating-gearing for seeders, comprising a driven shaft for operating a seed-dropping mechanism, a power-shaft arranged at right angles thereto for driving the said shaft, a bevel-gear mounted upon the driven shaft, a bevel-pinion carried by the power or driving shaft, a bracket engaging the hubs of both of the gears for tying them together and collars secured to the driven shaft and bearing against the bevel-gear for preventing the gear from moving longitudinally on the shaft and from being loosened by the action of the gears.

3. A seeder-operating mechanism, comprising a polygonal driven shaft, a driving-shaft arranged at an angle thereto, a bevel-gear having a polygonal aperture for fitting upon the said driven shaft the said gear having an elongated hub projecting therefrom, a pinion for driving the gear carried by the driving-shaft, a bracket engaging the ends of the pinion-hub and formed with a loop-bearing in one end fitting upon the elongated hub of the bevel-gear and means for securing the bevel-gear to the driving-shaft.

In testimony whereof I hereunto affix my signature in presence of two witnesses.

WILLIAM FETZER.

Witnesses:
A. C. FREEZE,
CHAS. KENT.